United States Patent
Huth et al.

(10) Patent No.: US 6,960,627 B2
(45) Date of Patent: Nov. 1, 2005

(54) PARTIALLY CROSS-LINKED POLYVINYL ALCOHOL

(75) Inventors: Hans-Ullrich Huth, Egelsbach (DE); Heinz Jörg Rath, Waldaschaff (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/486,937

(22) PCT Filed: Aug. 16, 2002

(86) PCT No.: PCT/EP02/09172

§ 371 (c)(1),
(2), (4) Date: Jul. 26, 2004

(87) PCT Pub. No.: WO03/016359

PCT Pub. Date: Feb. 27, 2003

(65) Prior Publication Data

US 2004/0242772 A1 Dec. 2, 2004

(30) Foreign Application Priority Data

Aug. 18, 2001 (DE) .......................... 101 40 597

(51) Int. Cl.$^7$ ................................ C08F 26/04
(52) U.S. Cl. ........................... 525/59; 525/61
(58) Field of Search ...................... 525/59, 61

(56) References Cited

U.S. PATENT DOCUMENTS

| | | | |
|---|---|---|---|
| 3,035,011 A | | 3/1962 | Bartl |
| 3,249,572 A | | 5/1966 | Davis et al. |
| 3,839,307 A | * | 10/1974 | Schmifg ........................ 525/61 |
| 4,456,731 A | * | 6/1984 | Caporossi et al. ............. 525/61 |
| 4,621,044 A | * | 11/1986 | Fujikawa ................. 430/281.1 |
| 5,331,045 A | | 7/1994 | Spinu |
| 5,594,050 A | * | 1/1997 | Audebert et al. .............. 524/5 |
| 5,830,953 A | | 11/1998 | Nishikawa |
| 6,166,117 A | | 12/2000 | Miyazaki |
| 2003/0166788 A1 | | 9/2003 | Papenfuha |

FOREIGN PATENT DOCUMENTS

| | | |
|---|---|---|
| EP | 884352 A | 12/1998 |
| GB | 602974 A | 6/1948 |
| GB | 891504 | 3/1962 |
| GB | 2094806 A | 9/1982 |
| JP | 54020093 A * | 2/1979 |
| JP | 63122778 A | 5/1988 |
| JP | 09316270 * | 9/1997 |
| JP | 09316270 A | 12/1997 |
| WO | WO 0166082 A | 9/2001 |
| WO | WO 0179305 A | 10/2001 |

* cited by examiner

Primary Examiner—Bernard Lipman
(74) Attorney, Agent, or Firm—Richard P. Silverman

(57) ABSTRACT

The invention relates to a partially cross-linked polyvinyl alcohol, obtained by reacting a polyvinyl alcohol with a polycarboxylic acid, in particular a hydroxypolycarboxylic acid. The partially cross-linked polyvinyl alcohol can be used to produce foils, which have a good water-solubility or water-swelling capacity. Due to this property, such foils can be used as packing material for detergents, cosmetics and the like. According to the invention, the packing dissolves in water, releases its contents or is suitable for releasing (permeation) chemical compounds or agents.

11 Claims, No Drawings

PARTIALLY CROSS-LINKED POLYVINYL ALCOHOL

Polyvinyl alcohol (PVA) is a macromolecule which is prepared from polyvinyl acetate by saponification (transesterification) and which, as well as the vinyl alcohol units, contains acetyl groups. A distinction is therefore made between fully and partially saponified grades. They have different properties and applications.

For instance, PVA serves as a protective colloid in the emulsion polymerization of branched vinyl monomers to stabilize polymer particles and also to control flow properties. Because of their solubility and also their superior adsorption properties to the latex particle surface and their higher interface activity, partially saponified grades are predominantly used for this purpose alone or in combination with fully saponified grades. The advantage of PVA is its particularly good stabilizing effect, making other emulsifiers and dispersing aids substantially redundant. PVA quantity and the PVA's degree of hydrolysis are superb instruments for influencing average particle size, agglomerate formation and also performance properties (bond strength, cross-linking, water fastness and breaking strength of dispersion films or pigment (salt) compatibility of dispersions).

In the textile sector, PVA is overwhelmingly used for sizing warp material. A size serves to strengthen the woven fabric construction in order that the mechanical stress of the weaving process may not lead to fiber damage. The size material (PVA) is usually washed off again after weaving. Essential properties demanded include high dissolving rate for the raw material or washoff-ability of the size, low tendency to foam, high adhesion to the textile and good filming and are in fact predominantly achieved by PVA.

But, like starch or starch degradation products, PVA can also be used as a raw material for manufacturing adhesive solutions (e.g., postage stamps, labels, envelopes and so on). The advantage here is the uniform chemical structure and high bond strength for the low amount of material needed.

In the paper industry, i.e., in the manufacture of plain paper and coated paper, PVA is notable for high pigment- and fiber-binding force, excellent carrier properties for optical brighteners, very good utility as stable-viscosity protective colloids and also coating water fastness, for which the low-viscosity fully saponified PVA grades are used in particular.

PVA has now also come to be used as a temporary binding and plasticizing agent for shaped ceramic articles, especially in electroceramics, on account of its low ash content, the use of water as a solvent and low shrinkage during firing.

Lastly, after external plasticization, PVA is useful for manufacturing water-soluble blow-extruded film for a very wide range of applications (washing bags, laundry detergent pouches, crop protection packaging). Film solubility can be adjusted in the range from fast to sparing by variation of PVA grade, plasticizer content and amount and also extrusion conditions.

Most of these fields of use are well served by the commercially available partially or fully saponified PVA grades having a degree of saponification from about 80 to 100 mol %. And the high number of OH groups and their interactions make possible the environmentally friendly processing in water and are responsible for the polymer being biodegradable, but also lead to a tendency to degrade below the melting point, so that this material of construction cannot be thermoplastically processed without additional external plasticization or requires higher temperatures to prepare aqueous solutions. An increased acetyl group fraction would only give a limited improvement.

A further disadvantage is that PVA film will always dissolve in the long run, i.e., this raw material is not suitable for applications requiring a certain degree of insolubility, but instead a controllable swellability or water absorption or hydrolytic or enzymatic degradability.

U.S. Pat. No. 3,249,572 and DE 694 03 067 describe reaction products formed from PVA and polyethyleneimine and respectively monocarboxylic acids and lactic acid. Neither of these documents describes the use of a polybasic (hydroxy) polycarboxylic acid.

Surprisingly, reaction of PVA in any composition with polycarboxylic acids or esters thereof gives novel polymers which are free of the above disadvantages and have novel and interesting properties.

The invention relates to cross-linked polyvinyl alcohols which mainly consist of polyvinyl alcohol units, but also contain 0.1% to 50% of polycarboxylic acid units, and which may be linked via partial ether and/or ester bonds to the PVA and, depending on reactivity, are obtained by reaction of PVA at room temperature or higher temperature in solution or substance with one or more polycarboxylic acid or esters thereof.

The invention accordingly provides cross-linked polyvinyl alcohols obtained by reaction of polyvinyl alcohol with compounds of the formula (1)

where A represents one or more, identical or different groups of the formulae

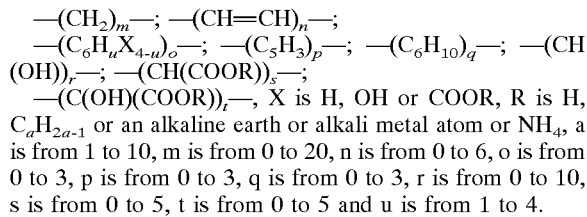

—$(C(OH)(COOR))_t$—, X is H, OH or COOR, R is H, $C_aH_{2a-1}$ or an alkaline earth or alkali metal atom or $NH_4$, a is from 1 to 10, m is from 0 to 20, n is from 0 to 6, o is from 0 to 3, p is from 0 to 3, q is from 0 to 3, r is from 0 to 10, s is from 0 to 5, t is from 0 to 5 and u is from 1 to 4.

Preference is given to hydroxy polycarboxylic acids, i.e., compounds of the abovementioned formula wherein A is a group of the formula —$(CH(OH))_r$—, a combination of groups of the formula —$(CH(OH))_r$— and —$(CH_2)_m$— or a combination of groups of the formula —$(C(OH)(COOH))_r$— and —$(CH_2)_m$— and R is hydrogen or methyl. Especial preference is given to tartaric acid, malic acid, citric acid. Also suitable are polycarboxylic acids which are free of hydroxyl groups and also singly or multiply unsaturated polycarboxylic acids which contain 1 to 6 and preferably 1 to 3 double bonds. The COOR groups may be present as free acid groups, as anhydride groups, as an alkali or alkaline earth metal salt or as an ester. Preferably, the polycarboxylic acids are present as free acids or esters, for example as methyl esters.

The polyvinyl alcohol may be a partially or fully saponified grade or a mixture of the two grades. The degree of saponification of the partially saponified grade is between 75 and 100 and preferably between 80 and 93 mol % and the degree of saponification of the fully saponified grade between 80 and 100 and preferably between 97 and 100 mol %. The degree of polymerization Pw may be between 50 and 5000, preference being given to products having a Pw from 200 to 3000. When mixtures of the two saponification grades are used, the ratio may be varied continually between 0.1% and 99.9% by weight.

The weight ratio of the starting components is preferably 100 parts by weight of polyvinyl alcohol: 0.1 part by weight of polycarboxylic acid to 1 part by weight of polyvinyl alcohol: 1 part of polycarboxylic acid. Particular preference is given to a weight ratio in the range from 100:0.5 to 100:20.

The cross-linked polyvinyl alcohols are prepared either by reaction in solution or suspension, preferably in a solvent such as water which is suitable for one of the two reactants, or in substance, i.e., in the absence of a solvent. In the first case, it is advantageous to heat to a higher temperature (80 to 250° C., preferably 80 to 200° C.), optionally under an inert gas atmosphere and with distillative removal of the volatile components (water, alcohol, solvent) and to carry on the reaction to the desired degree of conversion. In the second version, the PVA, optionally with addition of customary suitable plasticizers, is blended with the polycarboxylic acid and processed in a suitable apparatus, preferably in an extruder, optionally under an inert gas atmosphere at temperatures between 80 to 250° C. and preferably 150 to 230° C. in the melt until the desired conversion is obtained. Subsequently, in a second processing step, the reaction product may optionally be processed into film by blow extrusion.

The reaction product of the present invention is useful as a raw material for the manufacture of supported film, free-standing film, fiber, paint, adhesives and also as an additive or auxiliary material in cosmetics, papermaking and dispersion manufacture. Processing may take place not only in substance via the melt or from solution. Advantages depend on the way the reaction is carried out and the degree of conversion and include a broad and easily adjustable spectrum ranging from solubility to swellability, and easier extrudability, the simpler and diverse cross-linking and curing options and also better adhesion to surfaces compared with the starting polyvinyl alcohol.

Particularly, the products of the present invention are useful as water-soluble films or capsules for packaging or enrobing water-soluble formulations, such as laundry detergent and cleaner compositions, cosmetic preparations or crop protection formulations.

The examples which follow illustrate the invention.

EXAMPLE 1

10 kg of PVA having a degree of polymerization of about 600 and an average degree of hydrolysis of around 88 mol % were softened with 10% of a mixture of glycerol and water in a forced mixer. 100 g of dimethyl tartrate were then added. This mixture was strand extruded at 190° C. from a twin-screw extruder having a vacuum connection. The liquid resin strand was cooled in a water bath and then via air nozzles, dried and pelletized to give an almost colorless, transparent resin pellet which is readily soluble in water, has a Tg value of 52° C., a DIN 53015 4% viscosity of 4.9 mPas and a 190° C./2.16 kg melt index of 3.0 g/10 min.

EXAMPLE 2

A solution of 40 g of PVA having a degree of polymerization of about 1000 and an average degree of hydrolysis of around 98 mol % in 160 ml of water and 1.2 g of maleic anhydride were heated to 110° C. for 5 hours while the water was gradually removed to leave a solid light-colored resin which is insoluble in water and has a Tg of 87° C. The resin takes up about 68% of water when immersed in water for 24 hours.

EXAMPLE 3

A softened PVA pellet was prepared as in Example 1 and mixed with 1% of citric acid. This mixture was strand extruded at 179° C. from a twin-screw extruder having a vacuum connection. After a short cooling zone in water, the strand was further cooled with air nozzles and dried and subsequently pelletized. The slightly yellowish/amber-colored resin dissolves readily in water and has the following properties: Tg 48° C., MFI 7.5 g/min (190° C./2.16 kg). The resin is readily soluble in water and has a DIN 53015 4% viscosity of 4.0 mPas.

EXAMPLE 4

(Phthalic Anhydride) in Solution

A solution of 40 g of PVA having a degree of polymerization of about 3000 and an average degree of hydrolysis of around 88 mol % in 160 ml of water and 0.8 g of phthalic anhydride in 160 ml of water are heated to 130° C. for hours while the water is gradually removed to leave a light-colored, yellowish resin having a $T_G$ of 80° C., wherein the PVA has been partially cross-linked by the acid anhydride, since the resin partially dissolves in water, leaving behind a portion as a soft, highly swollen and insoluble gel.

EXAMPLE 5

A solution of 40 g of PVA having a degree of polymerization of about 600 and an average degree of hydrolysis of about 88 mol % and 1.6 g of citric acid in 160 ml of water were heated to 140° C. for 3 hours to give 42 g of a solid yellowish resin. The product is insoluble in cold and hot water and has a swellability of around 4%.

What is claimed is:

1. A water-soluble or water-swellable film consisting of a cross-linked polyvinyl alcohol obtained by mixing in water a polyvinyl alcohol with a polycarboxylic acid of formula (1)

ROOC-A-COOR (1)

where A represents one or more, identical or different groups of the formulae

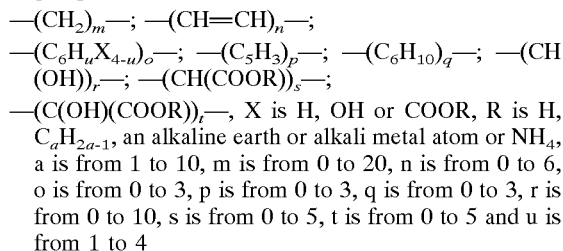

—$(CH_2)_m$—; —$(CH=CH)_n$—;
—$(C_6H_uX_{4-u})_o$—; —$(C_5H_3)_p$—; —$(C_6H_{10})_q$—; —$(CH(OH))_r$—; —$(CH(COOR))_s$—;
—$(C(OH)(COOR))_t$—, X is H, OH or COOR, R is H, $C_aH_{2a-1}$, an alkaline earth or alkali metal atom or $NH_4$, a is from 1 to 10, m is from 0 to 20, n is from 0 to 6, o is from 0 to 3, p is from 0 to 3, q is from 0 to 3, r is from 0 to 10, s is from 0 to 5, t is from 0 to 5 and u is from 1 to 4 and heating the mixture to a temperature above 150° C. to cross-link said polyvinyl alcohol.

2. A water-soluble or water-swellable capsule consisting of a cross-linked polyvinyl alcohol obtained by mixing a polyvinyl alcohol with a polycarboxylic acid of formula (1)

ROOC-A-COOR (1)

where A represents one or more, identical or different groups of the formulae

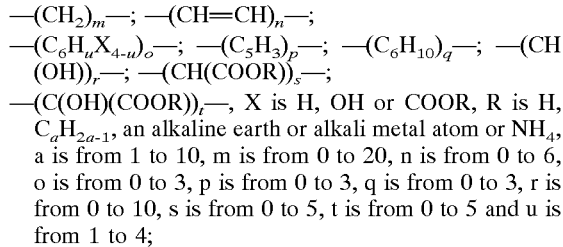

—$(CH_2)_m$—; —$(CH=CH)_n$—;
—$(C_6H_uX_{4-u})_o$—; —$(C_5H_3)_p$—; —$(C_6H_{10})_q$—; —$(CH(OH))_r$—; —$(CH(COOR))_s$—;
—$(C(OH)(COOR))_t$—, X is H, OH or COOR, R is H, $C_aH_{2a-1}$, an alkaline earth or alkali metal atom or $NH_4$, a is from 1 to 10, m is from 0 to 20, n is from 0 to 6, o is from 0 to 3, p is from 0 to 3, q is from 0 to 3, r is from 0 to 10, s is from 0 to 5, t is from 0 to 5 and u is from 1 to 4;

and heating the mixture to a temperature above 150° C. to cross-link said polyvinyl alcohol.

3. The water-soluble or water-swellable film of claim 1, wherein the temperature ranges from 150 to 250° C.

4. The water-soluble or water-swellable film of claim 1, wherein the polycarboxylic acid of formula (1) is selected from the group consisting of tartaric acid, malic acid, citric acid, and mixtures thereof.

5. The water-soluble or water-swellable film of claim 1, wherein a ratio of the polyvinyl alcohol to polycarboxylic acid ranges from 100 parts by weight of polyvinyl alcohol: 0.1 part by weight of polycarboxylic acid to 1 part by weight of polyvinyl alcohol: 1 part of polycarboxylic acid.

6. The water-soluble or water-swellable film of claim 1, wherein the mixing and heating steps take place in the presence or absence of a solvent.

7. The water-soluble or water-swellable film of claim 6, wherein the solvent is water.

8. A method for preparing a water-soluble or water-swellable film or capsule consisting of cross-linked polyvinyl alcohol and optionally a plasticizer, said method comprising:

a) admixing in the presence or absence of a solvent a polyvinyl alcohol with a polycarboxylic acid of formula (1)

$$ROOC-A-COOR \tag{1}$$

where A represents one or more, identical or different groups of the formulae $-(CH_2)_m-$; $-(CH=CH)_n-$; $-(C_6H_uX_{4-u})_o-$; $-(C_5H_3)_p-$; $-(C_6H_{10})_q-$; $-(CH(OH))_r-$; $-(CH(COOR))_s-$; $-(C(OH)(COOR))_t-$, X is H, OH or COOR, R is H, $C_aH_{2a-1}$, an alkaline earth or alkali metal atom or $NH_4$, a is from 1 to 10, m is from 0 to 20, n is from 0 to 6, o is from 0 to 3, p is from 0 to 3, q is from 0 to 3, r is from 0 to 10, s is from 0 to 5, t is from 0 to 5 and u is from 1 to 4;

b) heating the mixture to a temperature above 150° C. to provide said cross-linked polyvinyl alcohol; and c) forming the water-soluble or water-swellable film or capsule from the cross-linked polyvinyl alcohol.

9. The method of claim 8, wherein said forming step includes extrusion.

10. A water-soluble or water-swellable film prepared by the method of claim 8.

11. A water-soluble or water-swellable capsule prepared by the method of claim 8.

* * * * *